United States Patent
Fox et al.

(10) Patent No.: US 11,354,507 B2
(45) Date of Patent: Jun. 7, 2022

(54) COMPARED SENTIMENT QUEUES

(71) Applicant: INTERNATIONAL BUSINESS MACHINES CORPORATION, Armonk, NY (US)

(72) Inventors: Jeremy R. Fox, Georgetown, TX (US); Gregory J. Boss, Saginaw, MI (US); Liam S. Harpur, Dublin (IE); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

(21) Appl. No.: 16/130,934

(22) Filed: Sep. 13, 2018

(65) Prior Publication Data
US 2020/0089762 A1 Mar. 19, 2020

(51) Int. Cl.
| | | |
|---|---|---|
| *G06F 40/20* | (2020.01) | |
| *G06F 40/30* | (2020.01) | |
| *H04L 51/52* | (2022.01) | |
| *G06F 40/166* | (2020.01) | |
| *G06V 40/10* | (2022.01) | |

(52) U.S. Cl.
CPC .......... *G06F 40/30* (2020.01); *G06F 40/166* (2020.01); *G06V 40/10* (2022.01); *H04L 51/32* (2013.01)

(58) Field of Classification Search
None
See application file for complete search history.

(56) References Cited

U.S. PATENT DOCUMENTS

| | | | |
|---|---|---|---|
| 9,401,937 B1 | 7/2016 | Gottlieb | |
| 9,690,775 B2 | 6/2017 | Fink et al. | |
| 10,594,757 B1* | 3/2020 | Shevchenko | G06F 40/35 |
| 2004/0111479 A1* | 6/2004 | Borden | G06Q 10/107 |
| | | | 709/206 |
| 2008/0270116 A1* | 10/2008 | Godbole | G06F 40/35 |
| | | | 704/9 |
| 2011/0093417 A1* | 4/2011 | Nigam | G06F 40/253 |
| | | | 706/47 |
| 2011/0264531 A1* | 10/2011 | Bhatia | H04L 51/32 |
| | | | 709/224 |

(Continued)

OTHER PUBLICATIONS

Anonymous, "Leveraging Semantic Analysis for Notification Management," ip.com Prior Art Database Technical Disclosure No. IPCOM000241338D, Apr. 17, 2015, 5 pg.

(Continued)

*Primary Examiner* — Seong-Ah A Shin
(74) *Attorney, Agent, or Firm* — Cuenot, Forsythe & Kim, LLC

(57) ABSTRACT

Tracking social collaboration messages includes setting, by a computer, for a discussion group, a respective quota for each of a plurality of sentiment types assignable to a textual message; monitoring, by the computer, typing, by a sender, of text of a message for the discussion group; based on the monitored typing, determining, by the computer, a sentiment type of the message, the determined sentiment type being one of the plurality of sentiment types; and providing, by the computer, to the sender, recommendation for editing the message based on the quota set for the determined sentiment type.

20 Claims, 4 Drawing Sheets

(56) References Cited

U.S. PATENT DOCUMENTS

| | | | |
|---|---|---|---|
| 2012/0041937 A1* | 2/2012 | Dhillon | G06F 16/36 707/708 |
| 2013/0346067 A1* | 12/2013 | Bhatt | G06F 40/30 704/9 |
| 2014/0074844 A1 | 3/2014 | Subramanian et al. | |
| 2014/0188459 A1* | 7/2014 | Fink | G06F 40/30 704/9 |
| 2014/0317089 A1* | 10/2014 | Bao | G06Q 10/06 707/722 |
| 2015/0278196 A1* | 10/2015 | Dua | G06F 40/30 704/9 |
| 2016/0210281 A1* | 7/2016 | Fitterer | G06F 40/30 |
| 2016/0294755 A1* | 10/2016 | Prabhu | H04L 51/046 |
| 2016/0350314 A1 | 12/2016 | Chandrasekaran et al. | |
| 2016/0381533 A1* | 12/2016 | Fogelson | H04L 51/16 455/414.1 |
| 2017/0041264 A1 | 2/2017 | Khomami Abadi et al. | |
| 2017/0046496 A1* | 2/2017 | Johnstone | G06F 16/2228 |
| 2017/0126892 A1* | 5/2017 | Cecchi | H04M 3/5235 |
| 2017/0213138 A1* | 7/2017 | Bojja | G06N 7/005 |
| 2017/0228520 A1* | 8/2017 | Kidd | G16H 20/13 |
| 2017/0235830 A1* | 8/2017 | Smith | G06Q 50/01 707/748 |
| 2017/0243120 A1 | 8/2017 | Doan et al. | |
| 2017/0270099 A1 | 9/2017 | Gorny | |
| 2018/0005646 A1 | 1/2018 | Un et al. | |
| 2018/0006979 A1 | 1/2018 | Barsness et al. | |
| 2018/0049009 A1 | 2/2018 | Barsness et al. | |
| 2018/0145934 A1* | 5/2018 | Pappu | H04L 12/1822 |
| 2018/0152403 A1* | 5/2018 | Charignon | H04L 51/043 |
| 2018/0357286 A1* | 12/2018 | Wang | G06F 16/243 |
| 2018/0367484 A1* | 12/2018 | Rodriguez | G06Q 10/101 |
| 2019/0005021 A1* | 1/2019 | Miller | G10L 15/26 |
| 2019/0279656 A1* | 9/2019 | Arikawa | G06F 16/00 |
| 2019/0295533 A1* | 9/2019 | Wang | G10L 15/1815 |
| 2019/0379618 A1* | 12/2019 | Rabbat | H04L 51/10 |
| 2020/0059375 A1* | 2/2020 | Hewitt | H04L 51/12 |

OTHER PUBLICATIONS

Watson Tone Analyzer, [online] International Business Machines Corporation, [retrieved Sep. 11, 2018] retrieved from the Internet: <https://www.ibm.com/watson/services/tone-analyzer/>, 6 pg.

* cited by examiner

COMPARED SENTIMENT QUEUES

BACKGROUND

The present invention relates to computer-based social collaboration, and more specifically, to sentiment analysis of textual messages exchanged during the social collaboration.

Generally speaking, sentiment analysis aims to determine the attitude of a speaker, writer, or other subject with respect to some topic or the overall contextual polarity or emotional reaction to a document, interaction, or event. The attitude may be a judgment or evaluation, affective (or emotional) state of the author or speaker, or the intended emotional communication (that is to say, the emotional effect intended by the author). Social collaboration platforms and social media networks provide opportunities for users to send or post messages to other users with these messages varying in sentiment. Sentiment analysis of such messages can provide feedback to a user about how the sentiment of a message they drafted will likely be interpreted by a reader of that message.

SUMMARY

A method includes computer-implemented method, comprising: setting, by a computer, for a discussion group, a respective quota for each of a plurality of sentiment types assignable to a textual message; monitoring, by the computer, typing, by a sender, of text of a message for the discussion group; based on the monitored typing, determining, by the computer, a sentiment type of the message, the determined sentiment type being one of the plurality of sentiment types; and providing, by the computer, to the sender, recommendation for editing the message based on the quota set for the determined sentiment type.

A system includes a processor programmed to initiate executable operations. In particular the executable operations include setting for a discussion group a respective quota for each of a plurality of sentiment types assignable to a textual message; monitoring typing by a sender, of text of a message for the discussion group; based on the monitored typing, determining a sentiment type of the message, the determined sentiment type being one of the plurality of sentiment types; and providing to the sender, a recommendation for editing the message based on the quota set for the determined sentiment type.

A computer program product includes a computer readable storage medium having program code stored thereon. In particular, the program code is executable by a data processing system to initiate operations including: setting, by the data processing system, for a discussion group, a respective quota for each of a plurality of sentiment types assignable to a textual message; monitoring, by the data processing system, typing, by a sender, of text of a message for the discussion group; based on the monitored typing, determining, by the data processing system, a sentiment type of the message, the determined sentiment type being one of the plurality of sentiment types; and providing, by the data processing system, to the sender, a recommendation for editing the message based on the quota set for the determined sentiment type.

DETAILED DESCRIPTION

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being). The terms "employee" and "agent" are used herein interchangeably with the term "user".

Figure 1:
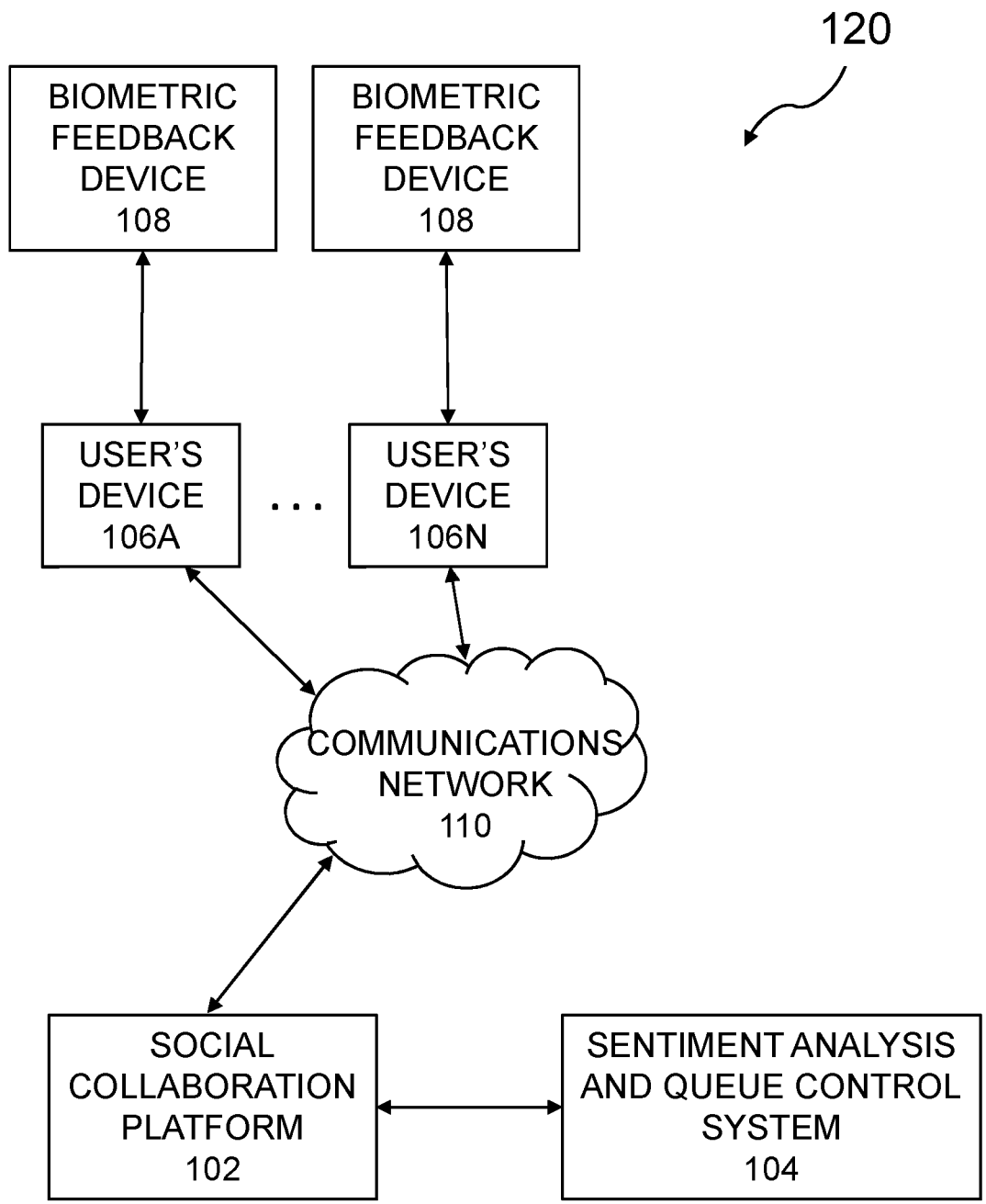
FIG. 1 illustrates a distributed computer-based system in accordance with the principles of the present disclosure.

FIG. 1 is a block diagram illustrating an example of a network data processing system 120 that includes a communication network 110. The communication network 110 is the medium used to provide communications links between various devices and data processing systems connected together within the computing environment (or network data processing system, etc.) 120. The communication network 110 may include connections, such as wire, wireless communication links, or fiber optic cables. The communication network 110 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies A social collaboration platform 102 allows users to send and receive messages (i.e., interact with one another) utilizing user devices 106A-106N. The social collaboration platform 102 can be a wide variety of diverse systems such as social networks for individuals and organizations (e.g., FACEBOOK, TWITTER, WHATSAPP, WECHAT, etc.), texts and instant messaging, e-mails, word processing applications, forums, web sites, blogs, web pages for reviews and comments, social collaboration platforms (e.g., GITHUB) or social collaboration services that focus on the identification of groups and collaboration spaces in which messages are explicitly directed at the group and the group activity feed is seen the same way by everyone. In general, the social collaboration platform 106 maintains a plurality of different queues in which messages are stored. A queue receives messages from one or more user devices and delivers the messages to one or more user devices. Each queue can be organized by, or associated with, a particular recipient identity, a particular product or service, a particular topic or subject, a particular collaborative group, etc. For purposes of the present description, the term "discussion group" is used to refer to one of these queues of messages that comprises the different interactions of a plurality of users.

As one example embodiment, a discussion group can involve one owner, or initiator, of the discussion group that posts an initial message which results in reply messages and posts from other users. As the owner user participates or interacts with the other users the social collaboration exchanges can unfortunately include negativity which discourages the owner user from continuing with social interaction or social collaboration. In general, most users benefit from interactive amounts of encouragement and positive sentiment during the delivery of electronic social-based communications. However, with the speed at which users can post comments and the number of potential commenters, social content and collaboration can quickly become overly negative, causing a user to become disengaged and disenfranchised regarding further social collaboration. Thus, a user may simply disengage from the social collaboration platform and not complete the conversation they began.

Comments or posts with negative sentiment, however, are not always unwarranted. A user may benefit from receiving helpful criticism or advice that may not necessarily appear to be positive or helpful. Embodiments in accordance with the principles of the present disclosure provide a way to manage the negative effects of criticism and negative comments between users engaging in social collaboration. In this manner, a healthy exchange of ideas is managed that still conveys a correct and helpful message to a receiving party. A sentiment analysis and queue control system 104 is depicted in FIG. 1 that, as described below, interacts with the social collaboration platform 102 to manage messages within different queues. In some embodiments, the sentiment analysis and queue control system 104 are multiple computers networked together. In other embodiments, the system 104 is a centralized computer or cluster of computers. In yet further embodiments, the social collaboration platform 102 and the sentiment analysis and queue control system 104 can be consolidated so that they appear to be a single computer platform or located at a single geographical location. In yet other embodiments, one or more functional components of the sentiment analysis and queue control system 104 can be downloaded to and reside on the user devices 106A-106N.

The sentiment analysis and queue control system 104 operates to prevent a social collaboration from becoming overly jaded with negativity and monotony while trying to complete a certain objective or task between involved users. The present system can establish differential message queues that stretch into the future which can be compared so as to allow delivery of messages in a way to maintain a certain level of effectiveness and positivity within the queues. A queueing mechanism is established for incoming messages where, for example, there is a pre-established quota on each of a plurality of sentiment types. At least some embodiments of the present system also collect biometric and physiological data feedback during the social sentiment analysis processing. Doing so allows users' feelings to be understood and accounted for, at a sentiment level, during the social collaboration or engagement.

The social collaboration platform 104 can initially inform users that the sentiment of messages they post in response to other users will be analyzed and in some instances the messages will not be sent or may be delayed. Users that agree to the terms and conditions of the social networking platform would then be allowed to continue. In one example, a user on the social collaboration platform 104 can establish, or start, a discussion group by posting a photograph of a project they are working on, or have completed, in order to solicit comments or feedback. The user can also define a desired outcome associated with this particular discussion group. For example, the desired outcome may value speed over less stress. In this instance, negative comments may be more acceptable so that controversial issues can be more readily identified and discussed. If less stress is of value, then fewer negative comments are desired and more positive comments are preferable than negative comments.

Another user, using an associated one of the user devices 106A-106N can compose a message to be sent to the user originating a particular discussion group. The sentiment analysis and queue control system 104 first analyzes the sentiment of the responding user's message or post and classifies the message according to sentiment.

Generally speaking, sentiment analysis aims to determine the attitude of a speaker, writer, or other subject with respect to some topic or the overall contextual polarity or emotional reaction to a document, interaction, or event. The attitude may be a judgment or evaluation, affective (or emotional) state of the author or speaker, or the intended emotional communication (that is to say, the emotional effect intended by the author). Existing approaches to sentiment analysis can be grouped into three main categories: knowledge-based techniques, statistical methods, and hybrid approaches. Knowledge-based techniques classify text by affect categories based on the presence of unambiguous affect words such as happy, sad, afraid, and bored. Some knowledge bases not only list obvious affect words, but also assign arbitrary words a probable "affinity" to particular emotions. Statistical methods leverage on elements from machine learning such as latent semantic analysis, support vector machines, "bag of words" and "Semantic Orientation—Pointwise Mutual Information". More sophisticated methods try to detect the holder of a sentiment (i.e., the person who maintains that affective state) and the target (i.e., the entity about which the affect is felt). To mine the opinion in context and get the feature about which the speaker has opined, the grammatical relationships of words are used. Grammatical dependency relations are obtained by deep parsing of the text. Hybrid approaches leverage on both machine learning and elements from knowledge representation such as ontologies and semantic networks in order to detect semantics that are expressed in a subtle manner, e.g., through the analysis of concepts that do not explicitly convey relevant information, but which are implicitly linked to other concepts that do so.

As one example, the present system 104 categorizes a prospective message or post as having positive sentiment, neutral sentiment, or negative sentiment. In other embodiments, the system 104 categorizes the prospective messages or posts in a number of sentiment categories such as joy, motivational, optimistic, humorous, anger, sadness, skeptical, harsh, criticism, etc. In some embodiments of the present disclosure, the sentiment analysis is performed in real-time as the responder is typing the message. As discussed above, the functional component which performs the real-time analysis may be stored and executing on the user device 106A-106N or, alternatively, an app or function on the user device 106A-106N that communicates the text of the message as it is being typed to a remotely located system 104 that performs the sentiment analysis and provides appropriate feedback to the user interface of the user device 106A-106N.

In other embodiments in accordance with the principles of the present disclosure, the message can be completed by the user and when the user tries to send the message, then the sentiment analysis can be performed.

Figure 2:
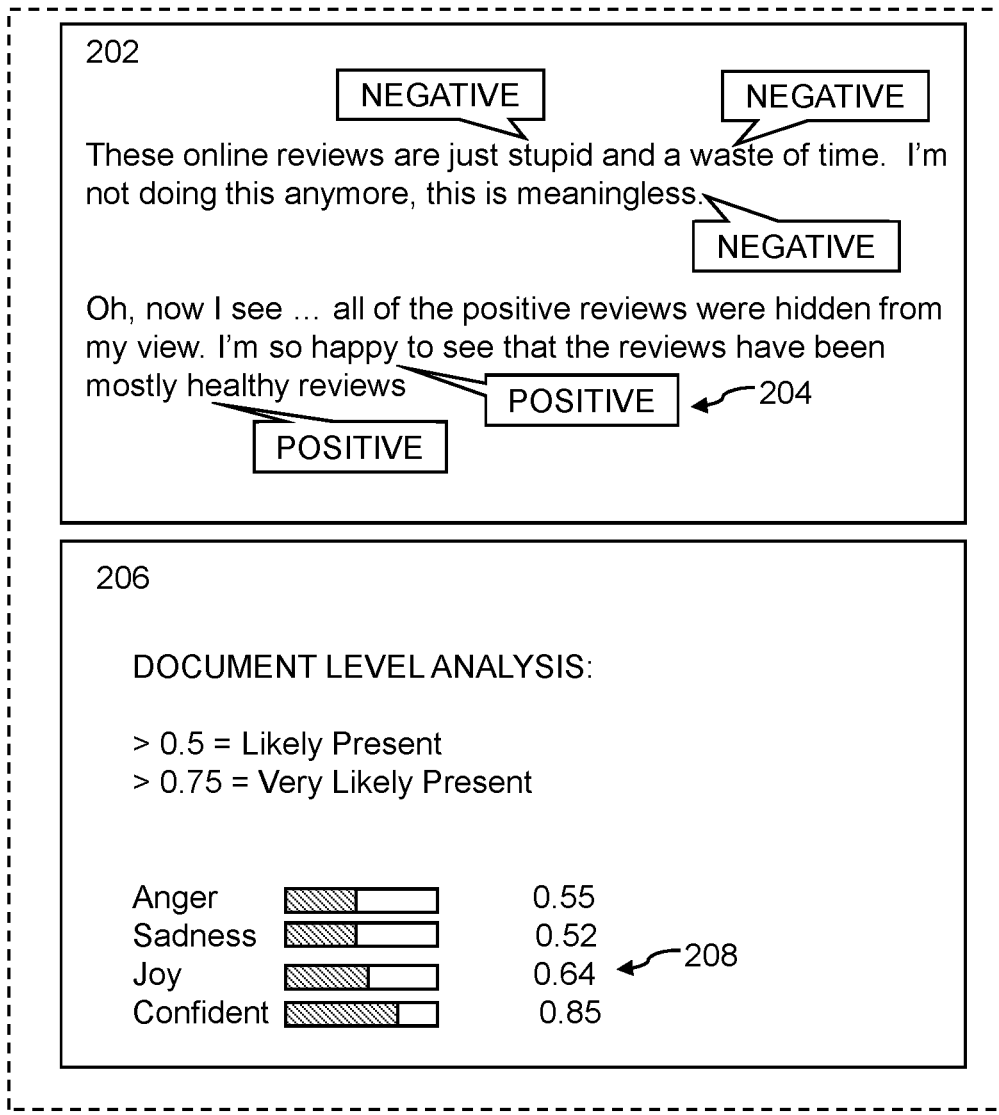
FIG. 2 illustrates an example user interface of how sentiment analysis can be reported to a user in accordance with the principles of the present disclosure.

Regardless of the manner in which the sentiment analysis is performed on the message, the result can be a word-level, sentence-level, or document-level output that reflects a sentiment within the message. One of ordinary skill will readily recognize that a combination of the different levels of sentiment analysis can be performed and reported to a user via a user interface of the user device 106A-106N. FIG. 2 illustrates an example user interface of how sentiment analysis can be reported to a user in accordance with the principles of the present disclosure. Analysis at the document-level provides a sense of the overall tone of the document and use sentence-level analysis identifies specific areas of the document where sentiment is the strongest or clearest.

The example interface of FIG. 2 has a first portion 202 with labels (e.g., 204) associated with specific words to help a user identify what may be contributing to a document-level sentiment score. The example interface also has a second portion 206 which provides a scorecard, for example, of the different sentiments expressed in the message at the document-level. Each sentiment 208 can be listed along with a corresponding confidence value. The sentiment analysis system 104 can limit the display of information to include only those sentiments which are detected above a particular confidence level (e.g. 0.5). Incoming messages for a particular user/topic/group can be separated into a respective queue corresponding to each sentiment type. Thus, in one example, the sentiment analysis and queue control system 104 can place an incoming message (for a particular topic/user/group) into a positive-sentiment queue, a negative-sentiment queue, or a neutral-sentiment queue.

As mentioned earlier, a user who starts a discussion group can specify a desired outcome (speed vs. stress) which helps define that user's preferred mix of messages having different sentiment types. For example, the sentiment analysis and queue control system 104 can, based on the user's input, determine that a user prefers to receive positive-sentiment items rather than negative-sentiment items. That preference, or user-defined "quota" can be defined in a number of different ways. For example, the user may desire to not receive two negative-sentiment messages within a 10 minute window. Another example is that the user may desire to receive three positive-sentiment messages for every one negative-sentiment message. A system administrator or a user in a supervisory role could also define the sentiment "quota" for a forum, website or collaboration service. The sentiment quota could be different for different topics or different sections of a forum, for example.

Based on the received messages for a topic/subject/user, the sentiment analysis and queue control system 104 can queue the messages into different sentiment queues and cause delivery of them to a user in accordance with the defined quota. In some instances, a sender of a message can be informed that the receiving user has set a sentiment preference which prevents delivery of the intended message before a particular time. The sentiment analysis and queue control system 104 can then offer the sender a chance to change the sentiment of the message so that it can be delivered sooner. Also, the sentiment analysis and queue control system can place received messages in one of the different sentiment-type queues and deliver messages from the different queues in accordance with the defined quota.

For example, as a message is received, the sentiment analysis and queue control system 104 places the message in one of the three queues (for example) in the order that it is received. The sentiment-related quota for this user/group/subject may indicate that over a 24-hour period the negative-sentiment messages and the positive-sentiment messages should be delivered at a 50/50 ratio and neutral-sentiment messages can be delivered as they are received. As a result, the sentiment analysis and queue control system 104 may not provide messages from the three queues to the social collaboration platform 102 in the order the messages were received. Instead, the sentiment analysis and queue control system 104 may provide messages from the three queues to the social collaboration platform in an order that achieves a defined quota.

Some embodiments in accordance with the principles of the present disclosure use biometric and physiological data during the sentiment analysis process. As shown in FIG. 1, the user devices 106A-106N may be connected to biometric feedback devices 108 that monitor such data. The biometric feedback data can be communicated to the sentiment analysis and queue control system 104.

From the message sender's perspective, the physiological and biometric data can be used as additional inputs for determining a user's sentiment when that user is composing an intended message to send. For example, when the biometric data and the sentiment analysis do not appear to agree, the sentiment analysis and queue control system 104 can alert the user that the intended message appears to be negative-sentiment (for example) while the biometric and physiological data appears to be related to positive sentiment (for example). In this way, a user may be alerted that a re-write or revision of the message should be considered.

From the perspective of a message recipient, the physiological and biometric data can reveal how the recipient is reacting to the various messages and the trends of the discussion group. The sentiment analysis and queue control system 104 can use this additional information about the recipient to improve the machine-learned algorithm for sentiment analysis of text or to adjust the defined quota for this topic/user/group. In other words, if the user is showing a stressful reaction, then the quota of 3-to-1 positive-sentiment vs. negative sentiment content can be changed to 5-to-1 for a time period (e.g., the next two hours). Changing the quota may also entail blocking any negative-sentiment message for a time period (e.g., the next 30 minutes). Example biometric data can include pulse, blood pressure, eye dilation, sweating, respiration rate, laughing, smiling.

For any received message, or intended message to be sent, the sentiment analysis and queue control system 104 can disallow delivery of that message, delay delivery of the message or ask the sender to re-write the message. Real-time trends can be considered when the system 104 selects one of those options. All messages from a sender can be associated together logically as an incoming message queue. The sentiment of that incoming message queue can be trending temporally such that the sender is progressively providing more negative-sentiment comments. These different logical incoming queues for the different senders can also be compared to one another to determine relative trends of the different users. The sentiment analysis and queue control system 104 can determine, for example, that a majority of the different senders are trending towards negative-sentiment comments or that a majority of senders are providing positive sentiment comments with only an outlying few senders being negative. Trends of the negative-sentiment queue vs. the positive-sentiment queue can be analyzed as well such as, for example, that the negative-sentiment queue is growing at a 2-to-1 rate as compared to the positive-sentiment queue. In accordance with the principles of the present disclosure, the sentiment analysis and queue control system 104 can adjust how messages are delivered based on detected trends in the sentiment of the messages to be delivered for a particular user/subject/group. In operation, the sentiment analysis and queue control system 104 delivers or prevents delivery of messages to the social collaboration platform 102 that are ultimately intended to be delivered to a user device 106A-106N.

Figure 3:
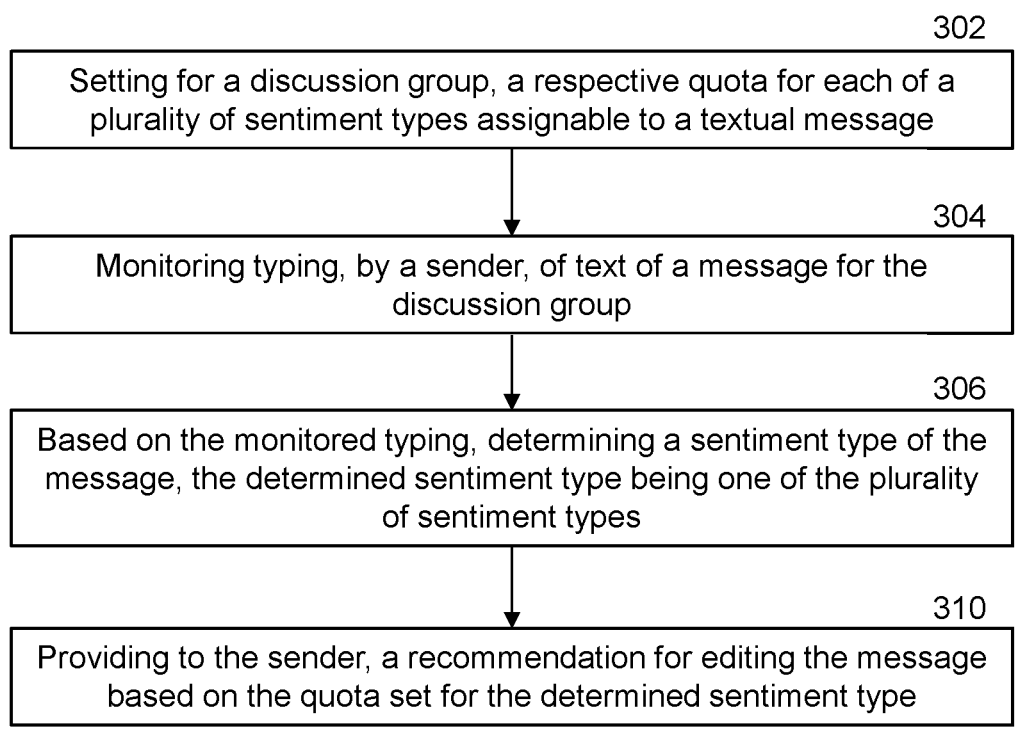
FIG. 3 is a flowchart of an example method of controlling sentiment queues in accordance with the principles of the present disclosure.

FIG. 3 is a flowchart of an example computer-implemented method in accordance with the principles of the present disclosure. Results of implementing this method in the physical world include improved network bandwidth by reducing the number of messages and reduced CPU usage by reducing many unnecessary escalations for other members of a given subscription or channel and by reducing the number of broadcast messages. In the computer-implemented method of FIG. 3, a computer, in step 302, can set for a discussion group, a respective quota for each of a plurality of sentiment types assignable to a textual message. An intended receiver of messages in a channel/discussion group/topic can, for example, set quotes for different sentiment types. As discussed above, the different sentiment types are those that can be assigned to textual message based on the content of that message. Example sentiment types can include "good", "neutral", and "negative" or, in other embodiments include "joy", "motivational", "optimistic", "funny", "sadness", "skeptical", "anger", "harsh", and "criticism". The user can specify the relative ration, or quotas for each sentiment type. One example may be that for the first three hours since the discussion group thread began, the receiver (user) would like to receive only 1 negative-sentiment message for every 3 positive-sentiment or neutral-sentiment messages. A system administrator of a social collaboration platform may also set the sentiment quotas as well.

In step 304, the computer monitors typing, by a sender, of text of a message for the discussion group. As explained above, this monitoring can be performed by software executing on a client device of the sender or by software executing on a server computer (e.g., system 102 or 104 of FIG. 1) remote from the sender's client device. In some embodiments, the monitoring is done in real-time as the sender is typing the message and in other embodiments the monitoring is done once the message is completed and/or sent by the client device to the social collaboration platform. Based on the monitored typing, the computer can determine in step 306 a sentiment type of the message. As described with respect to FIG. 2, the user (sender) can be provided a number of different feedback items to help identify the sentiment assigned to the message and why.

Ultimately, in step 308, the computer can provide to the sender, a recommendation for editing the message based on the quota set for the determined sentiment type. For example, the sender can be informed that the intended message is more negative than the sentiment quotas would allow to be delivered to the receiver or to the channel/topic/message group. In other embodiments, the message can still be received from the sender but the sentiment analysis and queue control system 104 may cause the social collaboration platform 102 to delay delivery or posting of the message. The delay can be based on an objective time-frame such as to space delivery of negative-sentiment messages by at least 15 minutes between each one. The delay can be a more fluid time-frame such as waiting until 3 positive-sentiment messages are delivered/posted before delivering/posting the next negative-sentiment message. In addition to controlling the way messages are queued and delivered, embodiments in accordance with the principles of the present disclosure may simply alert a sender of a message about the outcome of the sentiment analysis performed on the message. If a sentiment (as shown in FIG. 2) is above a certain threshold, the sentiment analysis and queue control system may inform the sender that the message is a positive-sentiment message or a negative-sentiment message. In this manner, the system provides the sender with feedback about whether the message appears to be conveying the sentiment that the sender intended.

Figure 4:
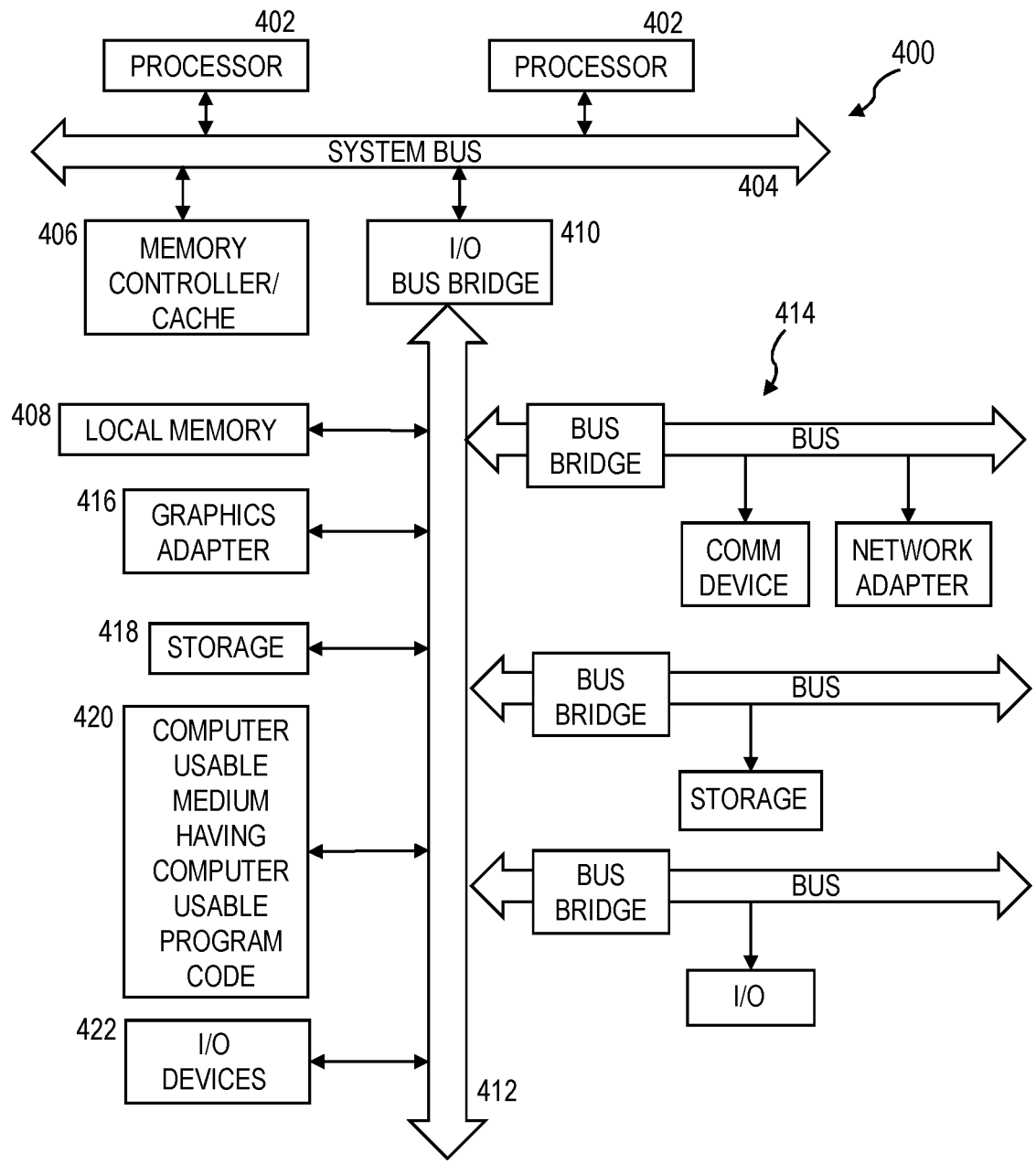
FIG. 4 depicts a block diagram of a data processing system in accordance with the present disclosure.

Referring to FIG. 4, a block diagram of a data processing system is depicted in accordance with the present disclosure. A data processing system 400, such as may be utilized to implement the social collaboration platform 102 or the sentiment analysis and queue control system 104 or aspects thereof, e.g., as set out in greater detail in FIG. 1, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more buses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3. It should be appreciated that the data processing system 400 can be implemented in the form of any system including a processor and memory that is capable of performing the functions and/or operations described within this specification. For example, the data processing system 400 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The data processing system 400, such as may also be utilized to implement the social collaboration platform 102 or the sentiment analysis and queue control system 104, or aspects thereof, e.g., as set out in greater detail in FIG. 1-FIG. 3.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method within and by a sentiment analysis and queue control system, comprising:

identifying, within a message queue for a collaboration platform, an original electronic message created by a sender and addressed to a receiver;

performing, using a machine-learning algorithm, a sentiment analysis on the original electronic message within the message queue;

forwarding, to a user interface within a client device associated with the sender, a result of the sentiment analysis;

delaying, for a period of time, delivery of the original electronic message to the receiver based upon a sentiment type of the original electronic message causing a sentiment quota associated with the receiver to exceed a predetermined value corresponding to the receiver; and delivering, after the period of time, the original electronic message to the receiver based upon the sentiment type not causing the sentiment quota of the receiver to be exceeded, wherein the sentiment analysis determines the sentiment type of the original electronic message, and the sentiment quota associated with the receiver changes based upon the sentiment type of the original electronic message.

2. The method of claim 1, wherein the forwarding the result of the sentiment analysis includes an electronic recommendation for editing the original electronic message based upon the sentiment type causing the sentiment quota of the receiver to be exceeded.

3. The method of claim 1, wherein the message queue is located within a server associated with the collaboration platform, and the original electronic message has already been sent from the sender.

4. The method of claim 1, wherein the message queue is located within the client device, the typing of the sender in generating the original electronic message is real-time monitored, and the performing the sentiment analysis is performed in real-time.

5. The method of claim 1, wherein the user interface is configured to display:

a world-level sentiment analysis of the original electronic message and a document-level sentiment score.

6. The method of claim 1, wherein the predetermined value corresponding to receiver is automatically adjusted based upon biometric data received from a biometric feedback device configured to monitor the receiver.

7. The method of claim 1, wherein the sentiment analysis and queue control system manages a plurality of message queues respectively associated with different sentiment types, and received electronic messages are queued within one of these plurality of message queues based upon a determined sentiment type associated with each of the electronic messages.

8. A computer hardware system including a sentiment analysis and queue control system, comprising:

a hardware processor programmed to initiate the following executable operations:

identifying, within a message queue for a collaboration platform, an original electronic message created by a sender and addressed to a receiver;

performing, using a machine-learning algorithm, a sentiment analysis on the original electronic message within the message queue;

forwarding, to a user interface within a client device associated with the sender, a result of the sentiment analysis;

delaying, for a period of time, delivery of the original electronic message to the receiver based upon a sentiment type of the original electronic message causing a sentiment quota associated with the receiver to exceed a predetermined value corresponding to the receiver; and delivering, after the period of time, the original electronic message to the receiver based upon the sentiment type not causing the sentiment quota of the receiver to be exceeded, wherein the sentiment analysis determines the sentiment type of the original electronic message, and the sentiment quota associated with the receiver changes based upon the sentiment type of the original electronic message.

9. The system of claim 8, wherein
the forwarding the result of the sentiment analysis includes an electronic recommendation for editing the original electronic message based upon the sentiment type causing the sentiment quota of the receiver to be exceeded.

10. The system of claim 8, wherein
the message queue is located within a server associated with the collaboration platform, and
the original electronic message has already been sent from the sender.

11. The system of claim 8, wherein
the message queue is located within the client device,
the typing of the sender in generating the original electronic message is real-time monitored, and
the performing the sentiment analysis is performed in real-time.

12. The system of claim 8, wherein
the user interface is configured to display:
  a world-level sentiment analysis of the original electronic message and
  a document-level sentiment score.

13. The system of claim 8, wherein
the predetermined value corresponding to receiver is automatically adjusted based upon biometric data received from a biometric feedback device configured to monitor the receiver.

14. The system of claim 8, wherein
the sentiment analysis and queue control system manages a plurality of message queues respectively associated with different sentiment types, and
received electronic messages are queued within one of these plurality of message queues based upon a determined sentiment type associated with each of the electronic messages.

15. A computer program product, comprising:
a computer readable storage medium having program code stored thereon,
the program code, which when executed by a computer hardware system including a sentiment analysis and queue control system, causes the computer hardware system to perform:

identifying, within a message queue for a collaboration platform, an original electronic message created by a sender and addressed to a receiver;

performing, using a machine-learning algorithm, a sentiment analysis on the original electronic message within the message queue;

forwarding, to a user interface within a client device associated with the sender, a result of the sentiment analysis;

delaying, for a period of time, delivery of the original electronic message to the receiver based upon a sentiment type of the original electronic message causing a sentiment quota associated with the receiver to exceed a predetermined value corresponding to the receiver; and delivering, after the period of time, the original electronic message to the receiver based upon the sentiment type not causing the sentiment quota of the receiver to be exceeded, wherein the sentiment analysis determines the sentiment type of the original electronic message, and the sentiment quota associated with the receiver changes based upon the sentiment type of the original electronic message.

16. The computer program product of claim 15, wherein
the forwarding the result of the sentiment analysis includes an electronic recommendation for editing the original electronic message based upon the sentiment type causing the sentiment quota of the receiver to be exceeded.

17. The computer program product of claim 15, wherein
the sentiment analysis and queue control system manages a plurality of message queues respectively associated with different sentiment types,
received electronic messages are queued within one of these plurality of message queues based upon a determined sentiment type associated with each of the electronic messages,
the plurality of message queues are located within a server associated with the collaboration platform, and
the original electronic message has already been sent from the sender.

18. The computer program product of claim 15, wherein
the message queue is located within the client device,
the typing of the sender in generating the original electronic message is real-time monitored, and
the performing the sentiment analysis is performed in real-time.

19. The computer program product of claim 15, wherein
the user interface is configured to display:
  a world-level sentiment analysis of the original electronic message and
  a document-level sentiment score.

20. The computer program product of claim 15, wherein
the predetermined value corresponding to receiver is automatically adjusted based upon biometric data received from a biometric feedback device configured to monitor the receiver.

* * * * *